US007980476B2

(12) United States Patent
D'Albore

(10) Patent No.: US 7,980,476 B2
(45) Date of Patent: Jul. 19, 2011

(54) IC CARD FILE SYSTEM

(75) Inventor: Guido D'Albore, Caserta (IT)

(73) Assignee: Incard SA, Geneva (CH)

( * ) Notice: Subject to any disclaimer, the term of this patent is extended or adjusted under 35 U.S.C. 154(b) by 1031 days.

(21) Appl. No.: 11/562,757

(22) Filed: Nov. 22, 2006

(65) Prior Publication Data

US 2007/0152070 A1   Jul. 5, 2007

(30) Foreign Application Priority Data

Nov. 23, 2005  (EP) ..................................... 05025492

(51) Int. Cl.
*G06K 19/06* (2006.01)
(52) U.S. Cl. ........ 235/492; 235/375; 235/380; 235/487; 711/165
(58) Field of Classification Search .................. 235/375, 235/380, 451, 487, 492, 486; 711/165
See application file for complete search history.

(56) References Cited

U.S. PATENT DOCUMENTS

| | | | | |
|---|---|---|---|---|
| 5,408,082 A * | 4/1995 | Takagi et al. | ................. | 235/492 |
| 6,381,176 B1 * | 4/2002 | Kim et al. | ................. | 365/185.11 |
| 6,480,935 B1 * | 11/2002 | Carper et al. | ................. | 711/115 |
| 6,501,962 B1 * | 12/2002 | Green | ............................ | 455/558 |
| 6,824,064 B2 * | 11/2004 | Guthery et al. | ............... | 235/492 |
| 6,944,650 B1 * | 9/2005 | Urien | ............................ | 709/217 |
| 7,426,605 B2 * | 9/2008 | Rudelic | ........................ | 711/103 |
| 2006/0173937 A1 * | 8/2006 | Sia et al. | ....................... | 707/205 |

FOREIGN PATENT DOCUMENTS

| | | |
|---|---|---|
| DE | 101 34 973 | 2/2003 |
| EP | 1 017 028 | 7/2000 |

OTHER PUBLICATIONS

ISO/IEC 7816-4:, "Interindustry Command for Interchange", Sep. 1, 1995, pp. 1-70, XP002258173.

* cited by examiner

*Primary Examiner* — Thien M. Le
*Assistant Examiner* — Tuyen K Vo
(74) *Attorney, Agent, or Firm* — Lisa K. Jorgenson; Allen, Dyer, Doppelt, Milbrath & Gilchrist, P.A.

(57) ABSTRACT

An IC card readable by a drive device and including at least one non-volatile memory portion to contain stored files. Moreover, there is an IC card application stored in the at least one non-volatile memory portion to organize the stored files and define their accessibility and to be driven by the drive device. Finally, an interchange application is stored in the at least one non-volatile memory portion to provide organization of the stored files in a high level logic structure of arbitrary length, identification of the stored files through alphanumeric identifiers of arbitrary length and extension, and accessibility of the stored files by the drive device.

26 Claims, 3 Drawing Sheets

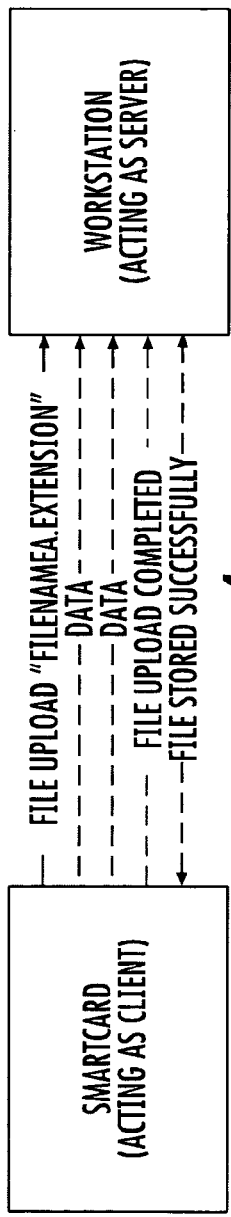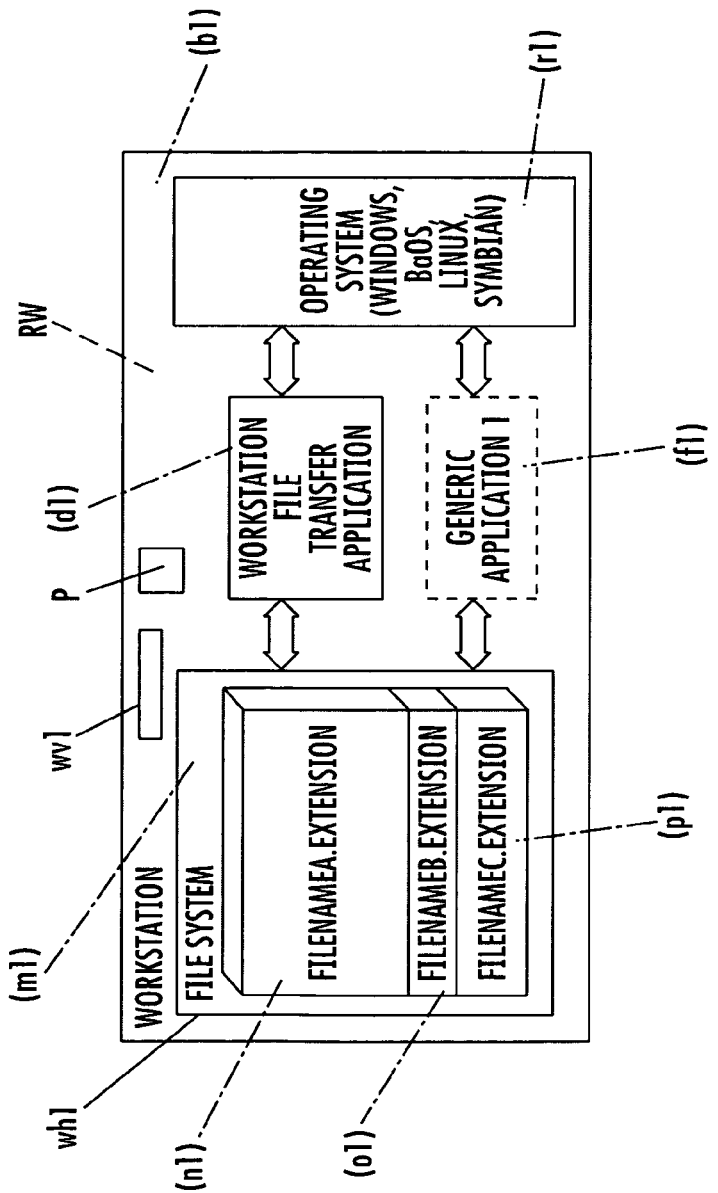

IC CARD FILE SYSTEM

FIELD OF THE INVENTION

This invention relates to a file system for an IC CARD. The invention further relates to a method for managing files stored inside an IC Card. In particular this invention relates to a file system according to the ISO 7816-4 standard that defines the data storage organization in a file system for an IC CARD, the access methods to files and algorithms stored inside it, and the standard communication protocol (APDUs) for communicating with an external read-write device.

The invention, more in particular but not exclusively, is directed to the logical organization of a file system for organizing and retrieving files independently from their physical structure inside non-volatile memory.

BACKGROUND OF THE INVENTION

As is well known, an IC CARD comprises non-volatile memories, for instance ROM and EEPROM memory portions, wherein data and algorithms are stored when the IC CARD is not electrically powered. When an algorithm needs to be executed, it is loaded from the non-volatile memories to the volatile memory RAM, together with specific data required from the same algorithm.

In particular, algorithms and data are organized inside the non volatile memories according to a storage system, commonly and hereinafter referred as file system, that drives their organization and retrieving, for instance for their loading inside RAM or for communication with an external read-write device.

The ISO 7816-4 standard defines how the data storage on the IC Card might be organized in a file system and the access methods to the file system, as well as the access methods to algorithms and the standard communication protocol to communicate between an electronic read-write device and the IC CARD file system.

More particularly, file systems of this kind support two categories of files: dedicated files (hereinafter DFs) and elementary files (hereinafter EFs) and are based on a logical organization of data able to organize and retrieve files independently from their physical structure inside the non-volatile memories, based on a hierarchical structure of DFs.

Generally the DF at the root is called the master file (MF) and is mandatory while other DFs are optional. EFs are classified in internal elementary files (IEFs), intended for storing data used only by the IC Card as instance for control purposes, and working elementary files (WEFs), intended for storing data not interpreted by the IC Card, for instance used by an external read-write device.

Generally the file system defines how files are referenced, structured, sized and accessed; for example the file system states that an EF is: referenced by a file identifier 2 bytes long or alternatively by a path from the MF to the EF constituted by a concatenation of file identifiers. Furthermore, the EF can be structured in two possible ways: a "transparent structure" that is a sequence of data units or a "record structure" that is a sequence of individually identifiable records. Moreover, the EF can be sized on fixed or variable records organized as a sequence (linear structure) or as a ring (cyclic structure).

It is evident by the previous description that IC Card file system is very similar to the file system implemented on other electronic read-write devices for non IC Card purposes, for instance PDAs, electronic calculators and workstations in general. For example many analogies can be noted between a well known file system for personal computers, like Microsoft Windows 2000 or UNIX, and the IC Card file system.

For instance, Microsoft Windows 2000 stores files in a directory, this directory can contain other directories and a mandatory root directory ("C:\") contains all the above directories in nested format; this is very similar to the IC Card file system, if we consider that a DF can contain EFs and other DFs and all the DFs are contained in nested format in MF.

Even if these two types of file systems share a basic and similar concept, they can't communicate. First of all, file systems for electronic read-write devices for non IC Card purposes are more flexible, for example allowing to reference files with a user provided alphanumeric file name, of arbitrary length, very different from the hexadecimal file identifier 2 bytes long usually allowed by IC Card file system.

Also, IC Card file systems are designed to manage secure data and it would be undesirable to disclose its content to an IC Card electronic device different from the common electronic read-write device expressly designed to read it, for example a workstation.

Even if this type of IC Card file system has advantages, especially for security reasons, from various points of view, it also has known drawbacks which are particularly evident when it is necessary to share non-secret files of the IC Card file system with an electronic read-write devices non IC Card purpose, for example to update files or to upgrade an application or algorithm stored inside the IC Card file system.

As a matter of fact the IC Card file system is completely closed with respect to electronic read-write devices for non IC Card purposes, not only providing a protection strategy but also denying access by common and useful applications to improve the functionality of the IC Card and to render it a complete and integrated support.

The U.S. Pat. No. 6,944,650 discloses an interface application between applications stored in an IC Card and an external file system, for example belonging to a host device. However, in this case files of the external file system may be accessed by applications stored inside the IC Card only through the interface application, since such files are not in a standard IC Card file system format, for example according to ISO 7816-4 specifications.

SUMMARY OF THE INVENTION

The aim of the present invention is to provide a file system for IC Cards able to communicate with an electronic read-write device of a standard type, that is to say not structured for reading or writing an IC Card, while respecting the standards specified by International Standard Organization in ISO/IEC 7816-4 and at the same time without weakening the security of the IC Card file system, capable of overcoming, simply and flexibly, all the above-mentioned drawbacks connected to the known art.

In other words, the present invention is directed to convert files belonging to a host file system into converted files, complying with the IC Card standard file system so that standard IC Card applications stored in the IC Card may access such converted files.

A further aim of the invention is that of integrating IC Card applications and data with electronic read-write devices not exclusively designed for IC Card purposes, allowing the possibility to improve IC Card functionality with applications and data already available in other electronic devices, at the same time without weakening the security policy of the IC Card.

Another aim of the invention is that of protecting the internal structure of the IC Card and its data, completely masking it through an interconnection application allowing the use of a non IC Card purpose electronic device to support the IC Card's needs, at the same time exposing to said electronic device only files not protected by the IC Card policy.

One embodiment of the present invention relates to a file system for an IC Card readable by a drive device and comprising an integrated circuit, a non-volatile memory portion containing stored files, and/or at least a further memory portion for organizing the stored files, for defining their accessibility by an IC Card application stored inside one or any of the non-volatile memory portions, inside the integrated circuit or further memory portions, the IC Card application being driven by an external read-write device connected to the IC Card through a connection, including the drive device, wherein the read-write device is a host computer including files stored and organized according to a standard host file system and the connection is a standard host connection. An interchange application is stored inside the non-volatile memories for providing the organization of the stored files in an additional high level logic structure of arbitrary length and the identification of the stored files through alphanumeric identifiers of arbitrary length and extension as well as the accessibility of the stored files by the host computer.

BRIEF DESCRIPTION OF THE DRAWINGS

Further features and advantages of the invention will be apparent from the following description of an embodiment thereof, given by way of non-limiting examples with reference to the accompanying drawings.

FIG. 4 represents, in a sequence of steps, the upload of files from an electronic read-write device to an IC card, according to the present invention.

FIG. 5 represents the file system of an electronic read-write device for non IC Card purposes, according to prior art.

DETAILED DESCRIPTION OF THE PREFERRED EMBODIMENTS

Figure 1:
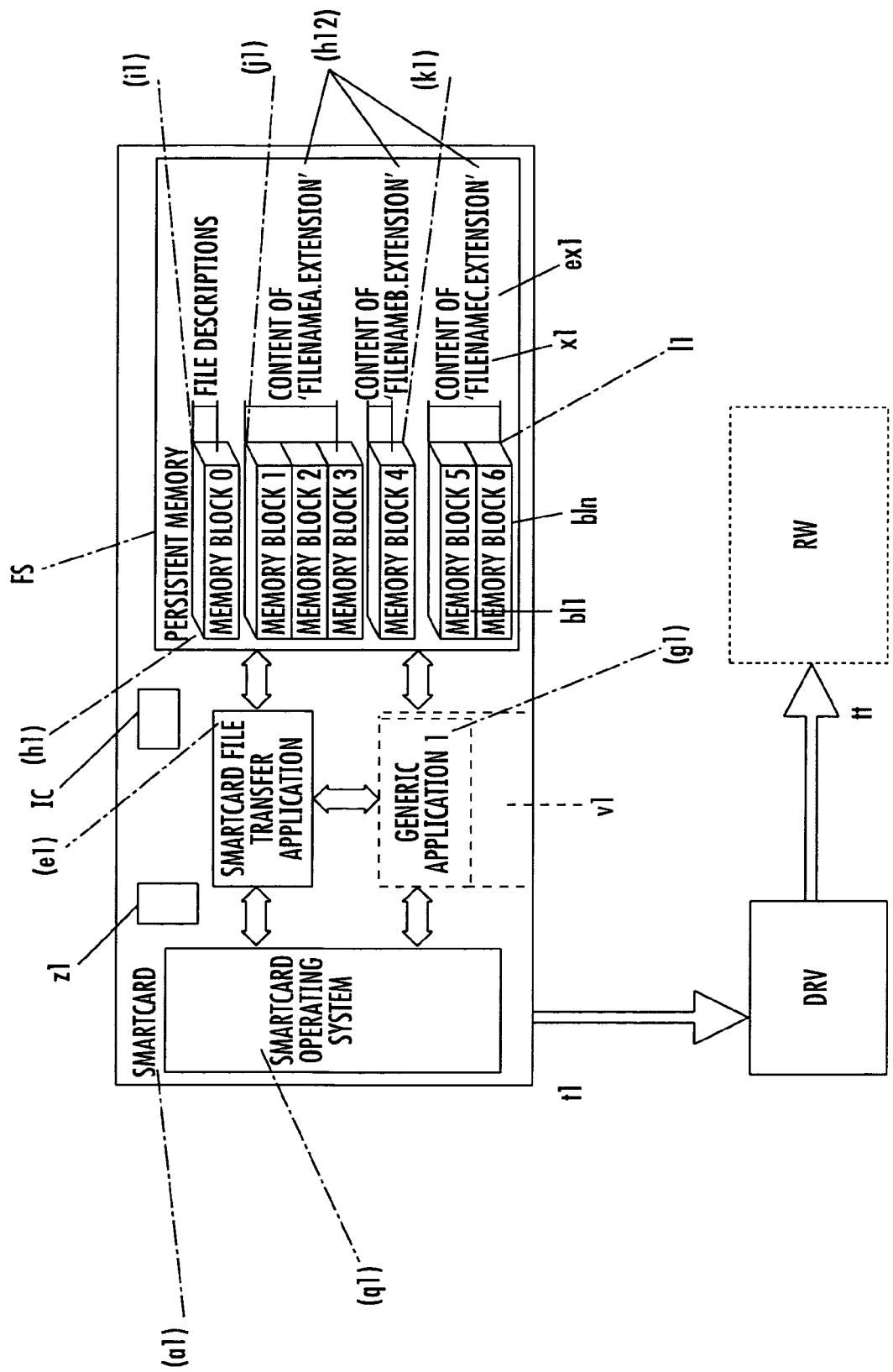
FIG. 1 represents an IC Card provided with a non-volatile memory organized through a file system, according to the present invention.
Figure 2:
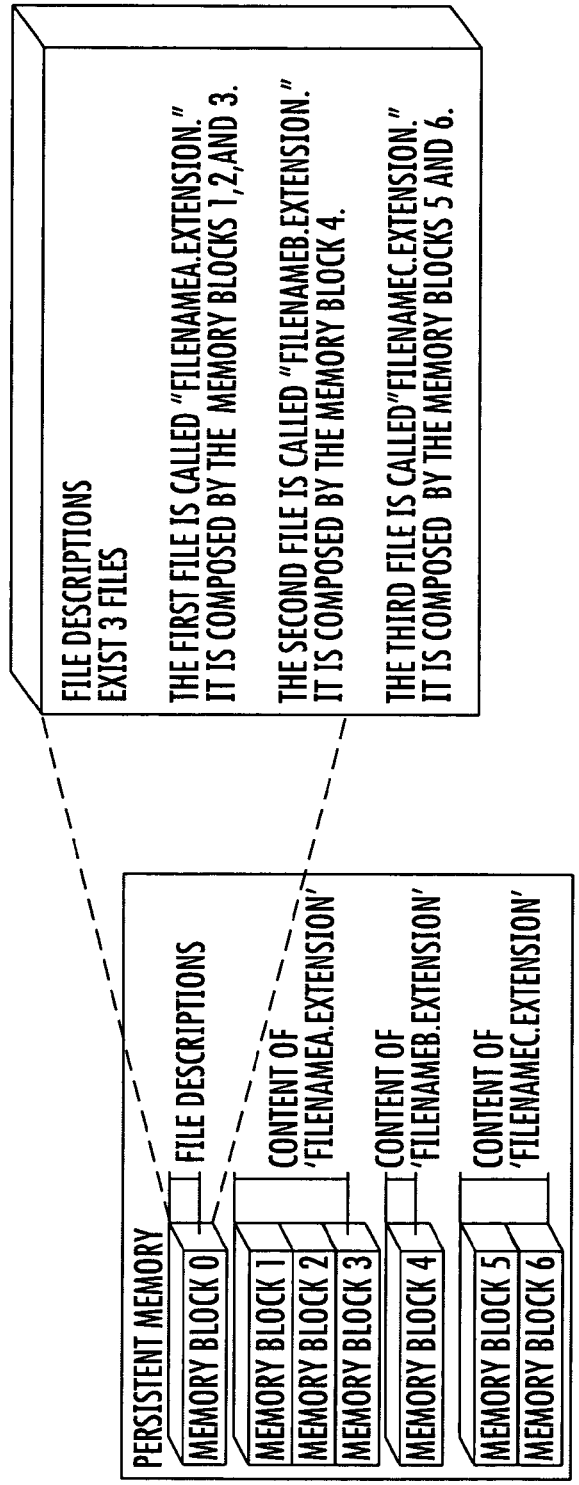
FIG. 2 represents in more detail the tag-length logic structure of the non-volatile memory of FIG. 1.
Figure 3:
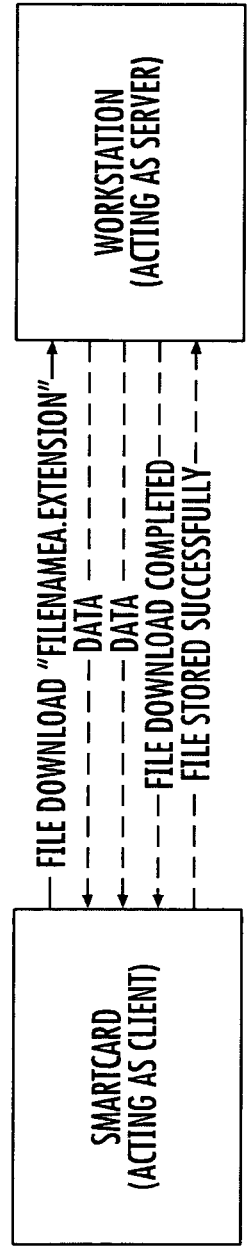
FIG. 3 represents, in a sequence of steps, the download of files from an IC card to an electronic read-write device, according to the present invention.

With reference to FIG. 1, shown and globally indicated as a1, is an IC Card comprising an integrated circuit IC, at least a first non volatile memory portion h1, for example an EEPROM type memory, another optional non-volatile memory portion z1, for example a ROM type memory, and at least further memory portion, indicated with v1.

The further memory portion may be a volatile or a non-volatile memory. Generally such a further memory portion is a RAM type memory.

The non-volatile memories h1 and z1 contain a plurality of files h12 organized in a file system FS, as a preference a file system according to the standard specified by the International Standard Organization ISO/IEC 7816-4.

In particular the file system FS organizes files storage inside the non-volatile memories h1 and z1 and defines, through a logical structure, their accessibility by an IC Card application g1. This application g1 is stored inside memory h1 or z1, or in the integrated circuit IC and it can be in communication with an external read-write device RW, electrically connected to the IC Card a1.

The IC card may be read and write through a drive device DRV that is capable of reading files from the IC Card a1 and writing files on the IC Card a1 according to a specific communication protocol t1 compatible with IC Cards.

The file system FS includes an interchange application e1, stored inside one of the non-volatile memory portions h1 or z1 and specifically provided for driving the organization of the files h12 in a high level logic structure, for instance a tag-length logic structure. This high level logic structure may be considered an additional logic structure if compared to the standard logic structures usually provided for IC Cards.

Files h12 are organized according to such a tag-length logic structure and more specifically are defined by the following features: arbitrary length, identified by alphanumeric identifiers x1 of arbitrary length and extension ex1, and accessible by the part of an external read-write device RW, driven by the interchange application e1.

More particularly, the external read-write device RW may be a non IC card purpose device, like a workstation interconnected to the IC Card a1 by a standard host connection tt1. It may be noted that at least the portion tt1 of the standard host connection may be a wireless connection.

In other words, the external read-write device RW may be a host computer comprising volatile and/or non-volatile memory portions including files stored and organized according to a standard host file system. Those files are accessible by the operative system of the host computer and are generally identified through alphanumeric identifiers of arbitrary length and extension.

Moreover, such files are organized according to a standard high lever logic structure. Advantageously, the interchange application e1, that may even be downloaded by the IC Card a1, organizes the tag-length logic structure as individual memory blocks i1, j1, k1, each identified by an hexadecimal identification number and a relative block size. One of the memory blocks, in FIG. 1 indicated with i1, describes the content of the non-volatile memory h1, comprising the number of the files h12 stored in h1, their file name x1 and extension ex1, and, for each file h12, the location of memory blocks constituting its content.

All the files h12 can be accessed by a generic IC Card application g1 through a call to the interchange application e1; the application g1 is in turn stored inside one of the non-volatile memories, h1 or z1, or in the IC or already loaded inside the volatile memory v1.

In particular the interchange application e1 provides a set of commands to transfer files from and to an external read-write device RW, eventually a host computer, electrically connected to the IC Card a1 by a standard communication protocol like TCP/IP or Blue tooth.

With reference to FIG. 5, the external read-write device RW can be a workstation b1 equipped with a microprocessor P that operates according to workstation application d1, f1 loaded in the volatile memory wv1 and endowed with a storage device wh1, for example a hard drive, a memory card or a compact disc.

The storage device wh1 is organized according to a known workstation file system m1, like Microsoft Windows 2000 or UNIX, that drives the organization of data in files ready to be used by the applications d1, f1 and identified an alphanumerical name o1, as long as required by the applications and further comprising an alphanumerical extension p1, which describes the type of file content.

Advantageously, in order to exchange files between the workstation b1 and the IC Card a1, the interchange application e1 provides a set of commands that are independent from communication protocol tt1 used for the communication, and consequently independent from the physical interface t1 connecting the IC Card a1 to the workstation b1 (for instance it can be a serial interface, an Infrared or Bluetooth communication, the TCP protocol or other).

In order to guarantee that these file exchanges respect the security policy of IC Card file system FS and to guarantee a correct communication, the interconnection application e1 is responsible for remapping the files h12 according to the tag-length logic structure. In other words all files sent and received by the IC Card interchange application e1 are subject to reorganization in order to work correctly with the workstation files b1.

In particular, for each file received, the IC Card interchange application e1 stores the workstation file so that the generic application g1 on the IC Card a1 can access it. The workstation files, thus, are stored into the IC Card a1 file system FS by a memory block i1, named file descriptor, and a set of memory blocks j1, k1, l1, containing the entire content of the workstation file.

The memory block i1 includes, for each workstation file, information about its long filename and location of each memory block composing the content of workstation file. All the operations acting on the files stored in such way are controlled by the interchange application e1 so that, in case of file transferring (from IC Card a1 to workstation b1 and vice versa), the file are identified and reconstructed according to the abovementioned structuring.

The interchange application e1, in order to realize an interchange, may desirably at least guarantee the following set of commands:

Open connection: the IC Card a1 requires establishing a connection with the workstation b1 that replies by acknowledging the connection.

Close connection: the IC Card a1 requires the closing of an already opened connection. The workstation replies by acknowledging the closing of connection.

File listing: the IC Card a1 requires from the workstation b1 the listing of the files available in the workstation file system. The workstation replies with a listing comprising a list of long filenames in workstation file system m1 format.

File download: the IC Card a1 requests a file from the workstation b1 and, before downloading, indicates to the workstation b1 the name of file to be downloaded. At download completed, the IC Card a1 stores, in order to re-exchange the same file with the workstation b1 without any alteration of the content and identification of file, the received file in the original form (same file name and same content) in its own file. Then the IC Card a1 communicates to the workstation b1 that such file has been stored successfully.

File upload: the IC Card a1 sends a file to the workstation b1. The IC Card a1, before uploading, indicates to the workstation b1 the name of file to be uploaded. When the upload is completed, the workstation b1 stores, in order to re-exchange the same file with the IC Card a1 without any alteration of the content and identification of file, the received file in the same original form (same name and same content) in its own file system. After this, the workstation b1 communicates to the IC Card a1 that such file has been stored successfully.

Advantageously, by the interchange application e1, all the files are seen by the IC Card a1 like the ones used in the workstation b1 so that the workstation b1 simply uses the identification and the structuring of the files stored in its own file system without any changes; the IC Card a1 instead needs to remap its own files according to the workstation b1 ones, by means of the interconnection application e1.

Although specific embodiments of the invention have been described herein for purposes of illustration and with particular reference to the exchange between an IC Card and a workstation, various modifications may be made without deviating from the spirit and scope of the invention, for example to realize a file exchange with an IC Card and a PDA or other electronic read-write device, not specifically designed for reading IC Card and structured according to a different file system.

Advantageously, the file system for an IC Card according to the present invention, integrates an IC Card application and data with electronic read-write devices not exclusively designed for IC Card purposes, allowing the possibility to improve IC Card functionality with applications and data already available in other electronic devices, at the same time without weakening the security policy of the IC Card.

The internal structure of the IC Card and its protected data in fact may be completely masked through the interconnection application allowing the use of non IC Card purpose electronic devices as a support to the IC Card but exposing to the electronic device only files not protected by the IC Card policy.

That which is claimed is:

1. An IC card readable by a drive device and comprising:
   at least one non-volatile memory portion to contain stored files;
   an IC card application stored in said at least one non-volatile memory portion to organize the stored files and define their accessibility and to be driven by the drive device; and
   an interchange application stored in said at least one non-volatile memory portion to provide organization of the stored files in a high level logic structure of arbitrary length, identification of the stored files through alphanumeric identifiers of arbitrary length and extension, and accessibility of the stored files by the drive device;
   the interchange application also for transferring files from the drive device to the at least one non-volatile memory portion and remapping the transferred files into the high level logic structure.

2. An IC card according to claim 1 wherein the drive device comprises a host computer.

3. An IC card according to claim 1 further comprising an integrated circuit; and wherein the IC Card application is stored in at least one of the integrated circuit and said at least one non-volatile memory portion.

4. An IC card according to claim 1 wherein said interchange application organizes the high level logic structure as individual memory blocks, each identified by a specific identification number and a block size.

5. An IC card according to claim 4 wherein the specific identification number is a hexadecimal identification number.

6. An IC card according to claim 4 wherein one of the individual memory blocks comprises a non-volatile memory and describes content of the non-volatile memory including a file number of the stored files, their file name and extension and, for each stored file, location of the individual memory blocks containing its content.

7. An IC card according to claim 1 wherein the stored files can be accessed by said IC card application by a call to said interchange application.

8. An IC card according to claim 1 wherein said interchange application provides a set of commands to transfer at least one of the stored files from and to the drive device.

9. An IC card according to claim 8 wherein said interchange application is coupled to the drive device by at least one of a TCP/IP and Bluetooth protocol.

10. An IC card according to claim 1 wherein said at least one non-volatile memory portion comprises at least one of a ROM, EEPROM, and Flash memory portion.

11. An IC card according to claim 1 wherein the high level logic structure is a tag-length logic structure.

12. A system comprising:
an IC card comprising at least one non-volatile memory portion to contain stored files;
a drive device comprising a host computer;
a host connection coupling said IC card to said drive device;
an IC card application stored in said at least one non-volatile memory portion to organize the stored files and define their accessibility and to be driven by said drive device; and
an interchange application stored in said at least one non-volatile memory portion to provide organization of the stored files in a high level logic structure of arbitrary length, identification of the stored files through alphanumeric identifiers of arbitrary length and extension, and accessibility of the stored files by said drive device;
the interchange application also for transferring files from the drive device to the at least one non-volatile memory portion and remapping the transferred files into the high level logic structure.

13. A system according to claim 12 wherein said interchange application organizes the logic structure as individual memory blocks, each identified by a specific identification number and a block size.

14. A system according to claim 12 wherein one of the individual memory blocks comprises a non-volatile memory and describes content of the non-volatile memory including a file number of the stored files, their file name and extension and, for each stored file, location of the individual memory blocks containing its content.

15. A system according to claim 12 wherein the stored files can be accessed by said IC card application by a call to said interchange application.

16. A system according to claim 12 wherein said interchange application provides a set of commands to transfer at least one of the stored files from and to the drive device.

17. A system according to claim 12 wherein said interchange application is coupled to the drive device by at least one of a TCP/IP and Bluetooth protocol.

18. A system according to claim 12 wherein the high level logic structure is a tag-length logic structure.

19. A method for making an IC card, including at least one non-volatile memory portion to contain stored files, and readable by a drive device, the method comprising:
organizing the stored files and defining their accessibility with an IC Card application, to be driven by the drive device, and stored inside the at least one non-volatile memory portion; and
providing an interchange application, stored inside the at least one non-volatile memory portion, for providing organization of the stored files in a high level logic structure of arbitrary length, identification of the files through alphanumeric identifiers of arbitrary length and extension, and accessibility to the stored files by the drive device;
configuring the interchange application for transferring files from the drive device to the at least one non-volatile memory portion and remapping the transferred files into the high level logic structure.

20. A method according to claim 19 wherein the interchange application organizes the high level logic structure as individual memory blocks, each identified by a specific identification number and a block size.

21. A method according to claim 19 wherein one of the individual memory blocks comprises a non-volatile memory and describes content of the non-volatile memory including a file number of the stored files, their file name and extension and, for each stored file, location of the individual memory blocks containing its content.

22. A method according to claim 19 wherein the stored files can be accessed by the IC card application by a call to the interchange application.

23. A method according to claim 19 wherein the interchange application provides a set of commands to transfer at least one of the stored files from and to the drive device.

24. A method according to claim 19 wherein said interchange application is coupled to the drive device by at least one of a TCP/IP and Bluetooth protocol.

25. A method according to claim 19 wherein the at least one non-volatile memory portion comprises at least one of a ROM, EEPROM and Flash type.

26. A method according to claim 19 wherein the logic structure is a tag-length logic structure.

* * * * *